United States Patent

[11] 3,614,475

[72] Inventor Gordon J. Deboo
Sunnyvale, Calif.

[21] Appl. No. 56,791
[22] Filed July 21, 1970
[45] Patented Oct. 19, 1971
[73] Assignee The United States of America as represented by the Administrator of the National Aeronautics and Space Administration

[54] PHASE SHIFT CIRCUIT APPARATUS
9 Claims, 2 Drawing Figs.

[52] U.S. Cl. .......... 307/262, 307/230, 328/155
[51] Int. Cl. .......... H03k 1/12
[50] Field of Search .......... 328/155; 307/232, 230, 262; 330/21, 31, 107, 109; 323/101, 106; 333/18

[56] References Cited

UNITED STATES PATENTS 3,436,647 4/1969 Gobeli et al. .......... 328/155 X

*Primary Examiner*—Roy Lake
*Assistant Examiner*—James B. Mullins
*Attorneys*—Darrell G. Brekke, Armand G. Morin and John R. Manning

ABSTRACT: A phase shifting circuit for selectively shifting the phase of an input signal from 0° to 180°, the circuit maintaining the signal amplitude constant and independent of signal frequency. The circuit includes resistive and capacitive elements, a voltage variable impedance element, operational amplifier means and a phase detector coupled together in such a manner that a desired phase shift of anywhere between 0° and 180° can be selectively obtained in response to a simple adjustment of a circuit component.

PATENTED OCT 19 1971 3,614,475

INVENTOR.
GORDON J. DEBOO
BY
ATTORNEY

PHASE SHIFT CIRCUIT APPARATUS

The invention described herein was made by an employee of the United States Government and may be manufactured and used by or for the Government for governmental purposes without the payment of any royalties thereon or therefor.

BACKGROUND OF THE INVENTION

The present invention relates to electronic phase shifting apparatus and, more particularly, to a novel phase shifting circuit which enables the phase of an alternating current signal to be selectively shifted by any desired amount over a wide range of frequencies, while at the same time, maintaining the output signal amplitude constant.

The phase shifting of sine wave signals is a common requirement in electronic circuits, however, heretofore no simple circuit has been provided which is capable of shifting the phase of a sine wave linearly over a wide range of frequencies while at the same time maintaining the output amplitude constant. In FIG. 1 of the drawings three basic prior art phase shifting circuits are shown in simplified form, each of which is subject to certain disadvantages. For example, in FIG. 1(*a*) an integrating circuit comprised of a resistance $R_1$ and an operational amplifier $A_1$ having a feedback capacitance $C_1$ is illustrated. This circuit is capable of shifting a signal independent of frequency, but it has two principal disadvantages. One is that the phase shift is fixed at −90° and the other is that the outer amplitude varies materially with frequency.

In part (*b*) of FIG. 1, a differentiater circuit is illustrated which is comprised of a capacitance $C_2$ and an operational amplifier $A_2$ having a feedback resistor $R_2$. This circuit is also capable of shifting the phase of a signal independent of frequency but similar to the FIG. 1(*a*) embodiment it has the disadvantages that the phase shift is fixed at +90° and the output amplitude varies with frequency.

In part (*c*) of FIG. 1, a passive phase shifting circuit is illustrated which is comprised of a single capacitance $C_3$ and a single resistance $R_3$. This circuit can provide phase shifts of other than 90°, but has the disadvantage that the output amplitude and phase shift both vary with frequency.

More complex examples of such prior art phase shifting circuits may be found in the U.S. Pat. Nos. $C_{Shepherd}$, 2,376,392; Thompson et al., 2,794,948; and Lehmann et al., 3,065,403.

OBJECTS OF THE PRESENT INVENTION

It is therefore a primary object of the present invention to provide a novel phase shifting circuit capable of providing a selected and controlled phase shift, while maintaining the amplitude of the output signal constant over a wide range of frequencies.

Another object of the present invention is to provide an electronic phase shifting device which is simple in construction, economically feasible and operatively efficient.

Still another object of the present invention is to provide a novel phase shifting circuit operative such that the phase of an output signal with respect to an input signal can be selectively varied over at least 180° without resulting in an amplitude change in the output signal.

SUMMARY OF THE PRESENT INVENTION

In accordance with the present invention, a novel phase shifting circuit is provided which is capable of selectively shifting the phase of an input signal from 0° to 180° without corresponding change in signal amplitude and independent of signal frequency. The circuit includes resistive and capacitive elements, a voltage variable impedance element, operational amplifier means and a phase detector coupled together in such as manner that a desired phase shift of any degree between 0° and 180° can be selectively obtained in response to a simple adjustment of a circuit component.

Among the principal advantages of the invention is that the selected phase shift between input and output is accomplished by making an electronic comparison of the phase difference of these two signals and using the electrical result of the comparison to drive electronic components of the circuit to effect the desired phase shift. The circuit continuously drives itself to a balanced or null condition at a selected input-output phase relationship in a manner which is independent of signal frequency.

Other objects of the present invention will become apparent to those skilled in the art after having read the following detailed disclosure of a preferred embodiment which is illustrated in the drawings.

IN THE DRAWINGS

DETAILED DESCRIPTION OF A PREFERRED EMBODIMENT

Figure 1:
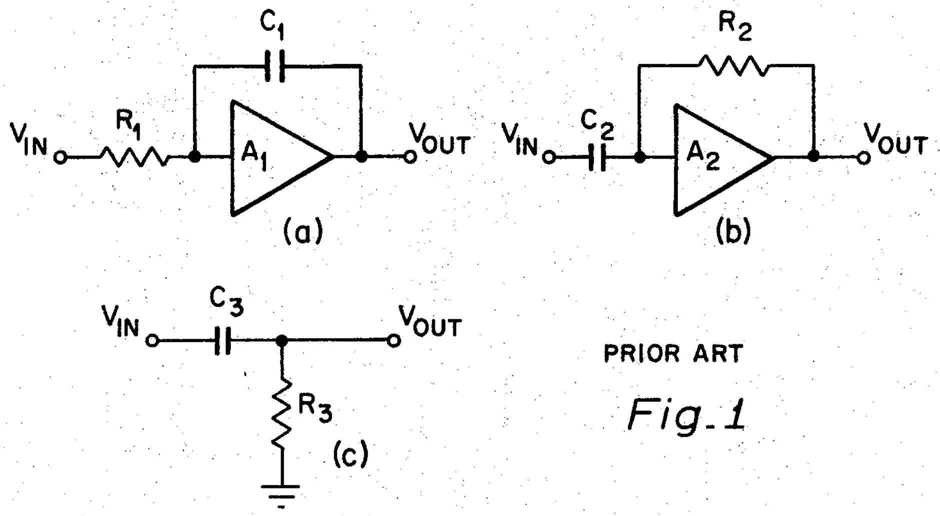
PRIOR ART Fig 1
FIG. 1 is a simplified illustration of the three basic methods commonly used in the prior art to obtain a shift in the phase of a given electrical signal.
Figure 2:
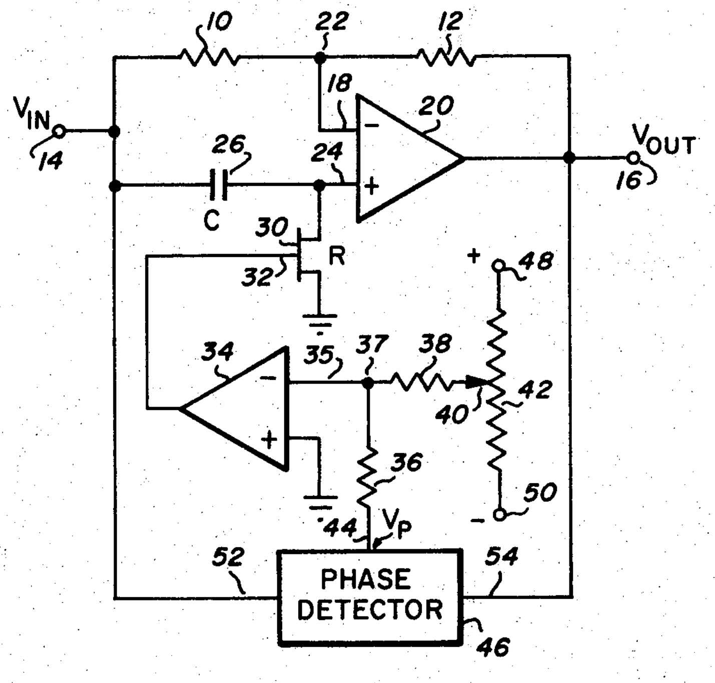
FIG. 2 is a simplified schematic circuit of the present invention.

In order to overcome the disadvantages of the prior art circuits illustrated in their most basic forms in FIG. 1 of the drawings and to provide improved apparatus over those disclosed in the above mentioned patent disclosures, a novel phase shifting circuit illustrated in the preferred embodiment shown in FIG. 2 of the drawings is provided. The circuit includes a pair of matched resistors 10 and 12 of equal resistance coupled together in series between an input terminal 14 and an output terminal 16. The negative input 18 of an operational amplifier 20 is coupled to the junction point 22 between the series resistors 10 and 12, and the positive input 24 of amplifier 20 is capacitively coupled through a capacitor 26 to the input terminal 14. The positive terminal 24 is also coupled to circuit ground through a voltage variable resistance R which may take the form of a field effect transistor (FET) 30.

The gate 32 of the FET 30 is coupled to the output of an operational amplifier 34 whose positive input is grounded and whose negative input 35 is coupled to the junction point between a pair of fixed resistors 36 and 38 connected in series. One end of the series circuit including resistors 36 and 38 is connected to the wiper 40 of a potentiometer 42 and the other end is connected to the output terminal 44 of a phase detector 46. The end 48 of the resistance element of potentiometer 42 is connected to a positive potential source and the opposite end 50 is connected to a negative potential source so as to provide a source of reference potential the value of which may be selected by a setting of the wiper 40.

The inputs 52 and 54 to phase detector 46 are coupled respectively to the input and output terminals 14 and 16 respectively, such that phase detector 46 compares the phase of the signals appearing at terminals 14 and 16 to produce a voltage $V_P$ at its output 44 which corresponds to the difference in phase therebetween.

The transfer function T(*p*) p) of the circuit illustrated in FIG. 2 may be expressed as $$T(p)=\frac{V_{\text{out}}}{V_{\text{in}}}=-\left[\frac{1-pCR}{1+pCR}\right]=-\left[\frac{1-j\omega CR}{1+j\omega CR}\right]$$

and the phase shift $\theta$, produced by such a transfer function is (2)

$\theta=\tan^{-1}(-\omega CR)-\tan^{-1}(+\omega CR)$ where in both equations $C$ is the capacitance of the capacitor 26, $R$ is the resistance of the FET 30, and $\omega$ equals $2\pi f$, and is therefore a function of the frequency $f$ at which the circuit operates.

As may be noted from equation (2), if $C$ and $R$ are constant, the phase shift will vary as frequency varies since $\omega$ equals $2\pi$ times the frequency $f$. However, the resistance $R$ can be made to vary in such a manner that $\omega R$ and hence $\theta$ remains constant as $\omega$ varies by causing the FET resistance $R$ to vary in such a manner as to maintain the phase shift of the circuit constant as frequency varies. The amplitude of the phase shifted signal accordingly remains constant as indicated by the expression for T(*P*) in equation (1) above.

Since the two signals fed to the phase detector 46 are the circuit input and output voltages, $V_{in}$ and $V_{out}$ respectively, and it is desired to maintain the phase relationship therebetween constant, appropriate circuit means are provided for varying the resistance of FET 30 in accordance with the output of phase detector 46.

The resistance of FET 30 varies with the voltage applied to the gate thereof, therefore, an appropriate voltage for application to the gate 32 to maintain the phase shift constant can be obtained from the output of phase detector 46. Phase detector 46 is a standard phase detector whose output voltage is a function of the relative phase difference between the two signals applied to its input terminals 52 and 54. Thus, a phase difference of $\theta_1$ results in a DC output voltage $V_{P1}$ at terminal 44, a phase difference $\theta_2$ results in a DC output voltage of $V_{P2}$ at terminal 44, etc.

Operational amplifier 34 will generate an output voltage for application to gate 32 of FET 30 which is sufficient when negatively fed back to its input 35 to maintain the net potential at that point at ground potential, or 0 volts. However, the voltage applied to FET 30 also causes a phase shift between input terminal 14 and output terminal 16 which tends to drive the output $V_P$ of detector 46. Thus, by providing a potential from potentiometer 42 which is opposite to $V_P$ so as to reduce the voltage at node 37 to zero any desired phase shift may be obtained by merely selecting the appropriate setting of potentiometer 42 which is equal to the voltage $V_P$ generated by detector 46 in response to the desired phase difference. Not only does this enable a desired phase shift to be selected but it also means that should a frequency change appear in the input signal at terminal 14 which would tend to cause a shift in phase, the detector output in response to the change will cause amplifier 34 to generate a voltage for application to FET 30 which will drive $V_P$ back to the value required to produce a null at node 37. The loop gain of the circuit is high enough that virtually any change from the desired phase difference is sufficient to provide a strong correcting signal for application to the gate of the FET. Thus, the phase difference between the input and output signals will be maintained constant even though the frequency thereof varies.

By way of example, if a particular phase difference between input and output of, say −30°, results in a $V_P$ of +5 volts out of the phase detector 46, the potentiometer 42 would be set to provide −5 volts where the resistances of resistors 36 and 38 are equal. Consequently, the voltage appearing at the negative input 56 of operational amplifier 34 would be 0 volts. Thereafter, if the frequency of the input signal $V_{in}$ applied to the device were to change so that the input-output phase difference started to change, the negative feedback in operational amplifier 34 in attempting to drive its negative input at terminal 56 back to 0 volts would supply a strong correcting signal to the FET gate 32, thus causing the resistance R to be varied to correct the phase difference between the input and output signals until the phase detector output voltage $V_P$ was back to +5 volts and the potential at terminal 56 was back to 0 volts, and accordingly, the phase difference back to −30°.

It will, of course, be understood that two identical circuits of the type illustrated can be cascaded to provide phase shifts of from 0° to 36° likewise maintaining constant amplitude and selected phase shift independent of frequency.

Whereas, after having read the foregoing disclosure, many alterations and modifications of the present invention will undoubtedly become apparent to those skilled in the art, it is to be understood that this disclosure is by way of illustration only and is in no way intended to be limiting to the particular embodiments disclosed. Accordingly, it is intended that the appended claims be interpreted as covering all such modifications which fall within the true spirit and scope of the invention.

What is claimed is:

1. Phase shifting apparatus comprising:

input terminal means and output terminal means coupled together by a series circuit including first and second resistance means of equal value;

operational amplifier means having one input thereof connected to said series circuit between said resistance means and another input thereof connected to said input terminal means through a capacitance means, the output of said amplifier means being connected to said output terminal means;

phase detector means operatively coupled between said input terminal means and said output terminal means for providing an output signal responsive to the phase difference between signals appearing at said input terminal means and said output terminal means; and variable resistance means coupling said another input of said operational amplifier means to circuit ground, said resistance means being variable in response to the output of said phase detector means so as to maintain a predetermined phase shift between the signals appearing at said input terminal means and said output terminal means.

2. Phase shift apparatus as set forth in claim 1 wherein said variable resistance means is a transistor means.

3. Phase shift apparatus as set forth in claim 2 wherein said variable resistance means is a field effect transistor means.

4. Phase shift apparatus as set forth in claim 3 and including circuit means for enabling the selective alteration of the relationship between the output of said phase detector means and the responsive variation of said resistance means, whereby said predetermined phase shift may be selectively chosen.

5. Phase shift apparatus as set forth in claim 4 wherein said circuit means includes a second operational amplifier means and a variable signal source means, said signal source means providing a signal of opposite polarity to that of said phase detector means and for addition thereto, said second operational amplifier means being responsive to the sum of the said signal addition to generate a voltage for application to said transistor means.

6. Phase shift circuit means comprising:

input terminal means and output terminal means;

operational amplifier means having one of its inputs coupled to said input terminal means through a first resistor means and to said output terminal means through a second resistor means, said second resistor means being of equal value to said first resistor means, a second input of said operational amplifier means being coupled to said input terminal means by a capacitor means, the output of said operational amplifier means being coupled to said output terminal means;

phase detector means coupled to said input terminal means and said output terminal means for generating a phase signal responsive to the difference in phase between signals appearing at said input terminal means and said output terminal means; and variable resistance means coupling said second input of said operational amplifier means to circuit ground, said variable resistance means being varied in response to said phase signal generated by said phase detector means so as to maintain a predetermined phase shift between said input terminal means and output terminal means.

7. Phase shift circuit means as set forth in claim 6 and further including reference signal generating means for generating a reference signal for comparison with said phase signal generated by said phase detector means, said variable resistance means being varied in response to the difference between said reference signal and said phase signal.

8. Phase shift circuit means as set forth in claim 7 wherein said phase signal generated by said phase detector means is a voltage of one polarity, said reference signal is a voltage of the opposite polarity and said variable resistance means is a field effect transistor means operatively responsive to the difference between said voltages.

9. Phase shift circuit means as set forth in claim 8 wherein a second operational amplifier means responsive to the difference between said phase signal and said reference signal is used to provide a control voltage for application to the gate electrode of said field effect transistor means.